United States Patent
Dang et al.

(10) Patent No.: US 8,064,397 B2
(45) Date of Patent: *Nov. 22, 2011

(54) METHOD FOR ALLOCATING TIME AND FREQUENCY RESOURCE FOR RESOURCE REQUEST INDICATOR, METHOD FOR TRANSMITTING RESOURCE REQUEST INDICATOR AND DEVICE THEREOF

(75) Inventors: Shujun Dang, Shenzhen (CN); Sha Ma, Shenzhen (CN); Xianghua Wang, Shenzhen (CN); Tianle Deng, Shenzhen (CN); Xiaobo Chen, Shenzhen (CN); Chengyu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,999

(22) Filed: Apr. 29, 2011

(65) Prior Publication Data

US 2011/0194528 A1 Aug. 11, 2011

Related U.S. Application Data

(63) Continuation of application No. 12/606,610, filed on Oct. 27, 2009, which is a continuation of application No. PCT/CN2008/070657, filed on Apr. 1, 2008.

(30) Foreign Application Priority Data

Apr. 27, 2007 (CN) .......................... 2007 1 0074241
Jun. 18, 2007 (CN) .......................... 2007 1 0127615

(51) Int. Cl.
*H04W 4/00* (2009.01)

(52) U.S. Cl. ....................................................... 370/329
(58) Field of Classification Search .................. 370/329, 370/330, 335, 336
See application file for complete search history.

(56) References Cited

U.S. PATENT DOCUMENTS

2007/0003062 A1  1/2007  Mizikovsky et al.
2009/0316811 A1  12/2009 Maeda

FOREIGN PATENT DOCUMENTS

| CN | 1434588 A | 8/2003 |
| CN | 101127748 A | 2/2008 |
| CN | 101352089 A | 1/2009 |
| EP | 2077677 A1 | 7/2009 |
| WO | WO 2008/041819 A2 | 4/2008 |
| WO | WO 2008/041820 A2 | 4/2008 |

(Continued)

OTHER PUBLICATIONS

Image File Wrapper in corresponding U.S. Appl. No. 12/606,610, filed Aug. 5, 2011.

(Continued)

*Primary Examiner* — Man Phan
*Assistant Examiner* — Nourali Mansoury
(74) *Attorney, Agent, or Firm* — Leydig, Voit & Mayer, Ltd.

(57) ABSTRACT

A method for allocating a time and frequency resource of a resource request indicator (RRI), a method for transmitting an RRI, and a device thereof are provided, which relate to a wireless communication technique and reduce the overhead of the time and frequency resource. The method for allocating a time and frequency resource of an RRI includes: allocating codes for an RRI and other uplink control signaling; and multiplexing the RRI and other uplink control signaling in the same time and frequency resource in a code division manner.

9 Claims, 10 Drawing Sheets

FOREIGN PATENT DOCUMENTS

WO    WO 2008/050467 A1    5/2008

OTHER PUBLICATIONS

International Search Report in corresponding PCT Application No. PCT/CN2008/070657 (Jul. 3, 2008).

"R2-070727—Dedicated Random Access Signatures," 3 GPP TSG RAN2#57, Feb. 12-16, 2007, 3$^{rd}$ Generation Partnership Project, St. Louis, Missouri.

"R1-070780—Scheduling Request using Contention Free Channel," 3GPP TSG RAN1#48, Feb. 12-16, 2007, 3$^{rd}$ Generation Partnership Project, St. Louis, Missouri.

"R1-071662—Uplink Scheduling Request for LTE," 3GPP TSG RAN WG1 #48bis, Mar. 26-30, 2007, 3$^{rd}$ Generation Partnership Project, St. Julian's, Malta.

"R1-071663—Multiplexing capability of CDM based Dedicated Scheduling Request," 3GPP TSG RAN WG1 Meeting #48bis, Mar. 26-30, 2007, 3$^{rd}$ Generation Partnership Project, St. Julian's, Malta.

Written Opinion of the International Searching Authority in corresponding PCT Application No. PCT/CN2008/070657 (Jul. 3, 2008).

Communication in European Application No. 08715389.6-2415, mailed Aug. 19, 2010.

1$^{st}$ Office Action in corresponding Chinese Application No. in Chinese Application No. 200710127615.0 (Dec. 4, 2009).

2$^{nd}$ Office Action in corresponding Chinese Application No. 200710127615.0 (Apr. 19, 2011).

"R1-073011—Multiplexing of Scheduling Request and ACK/NACK and/or CQI," 3GPP TSG RAN WG1 #49bis, Jun. 25-29 2007, Nokia Siemens Networks, Orlando, Florida.

"R1-072895—Multiplexing of Scheduling Request Indicator," 3GPP TSG-RAN-WG1 Meeting #49bis, Jun. 25-29, 2007, Huawei, Orlando, Florida.

"3GPP TS 36.211—3$^{rd}$ Generation Partnership Project; Technical Specification Group Radio Access Network; Phyiscal Channels and Modulation (Release 8)," Mar. 2007, Version 1.0.0, 3$^{rd}$ Generation Partnership Project, Valbonne, France.

"3GPP TS 36.213—3$^{rd}$ Generation Partnership Project; Technical Specification Group Radio Access Network; Physical layer procedures (Release 8)," Mar. 2007, Version 1.0.0, 3$^{rd}$ Generation Partnership Project, Valbonne, France.

"Multiplexing of Scheduling Request and ACK/NACK and/or CQI," 3GPP TSG RAN WG1 #49bis, Document No. R1-073011, Orlando, USA, Jun. 25-29, 2007, Source: Nokia Siemens Networks, Nokia.

S901 — the codes on the pilot time and frequency resource are divided into the code set adapted to bear the pilot part of the ACK and the code set adapted to bear the RRI, and the codes on the data time and frequency resource are divided into the code set adapted to bear the data part of the ACK and the code set adapted to bear the RRI.

S902 — the codes adapted to bear the RRI on the data time and frequency resource and the pilot time and frequency resource are respectively allocated for one user terminal, and the user terminal is assigned to send the RRI on the whole data and pilot time and frequency resources, at the assigned time point.

S903 — when the user terminal has data waiting to be sent, the user terminal sends the allocated RRI codes on the assigned time point.

S904 — the base station detects the RRI codes in the incoherent detection manner, and determines the user terminal that sends the RRI according to the transmission time point.

FIG. 9

METHOD FOR ALLOCATING TIME AND FREQUENCY RESOURCE FOR RESOURCE REQUEST INDICATOR, METHOD FOR TRANSMITTING RESOURCE REQUEST INDICATOR AND DEVICE THEREOF

CROSS-REFERENCE TO RELATED APPLICATIONS

This application is a continuation of U.S. patent application Ser. No. 12/606,610, filed on Oct. 27, 2009, which is a continuation of International Application No. PCT/CN2008/070657, filed on Apr. 1, 2008. The International Application claims priority to Chinese Patent Application No. 200710074241.0, filed on Apr. 27, 2007, and Chinese Patent Application No. 200710127615.0, filed on Jun. 18, 2007. The afore-mentioned patent applications are hereby incorporated by reference in their entireties.

FIELD OF THE TECHNOLOGY

The present invention relates to a wireless communication technique, and more particularly to a technique for allocating a time and frequency resource for a resource request indicator (RRI) and a technique for transmitting an RRI.

BACKGROUND OF THE INVENTION

In a current orthogonal frequency division multiplexing (OFDM/OFDMA) wireless communication system, if there's data waiting to be sent, a user terminal, synchronized with a base station already, needs to send an RRI to the base station, so as to request the base station to allocate an uplink transmission resource (hereafter referred to as a time and frequency resource) adapted to bear the data. The RRI is also called a scheduling request indicator (SRI). After receiving the RRI, if the base station allocates a time and frequency resource for the user terminal, the base station sends resource allocation information to the user terminal. The user terminal also requires a time and frequency resource when sending the RRI, so the base station needs to allocate the time and frequency resource adapted to bear the RRI for the user terminal in advance.

There is a method for allocating a time and frequency resource adapted to bear an RRI for the user terminal. In this current method, a time and frequency resource separately reserved is shared by certain user terminals to send the RRIs. The RRI of each user terminal employs all the OFDM symbols in one time slot, and the RRIs of different user terminals are differentiated through different time and frequency two-dimensional code sequences. The time and frequency two-dimensional code sequences refer to code sequences two-dimensionally extended in time domain and frequency domain, and any two of the code sequences are orthogonal or quasi-orthogonal with each other.

During the process of realizing the present invention, the inventor(s) finds that the conventional art at least has the following problems. A base station needs to reserve a relatively fixed time and frequency resource of all the time and frequency resources. The relatively fixed time and frequency resource is allocated for a data part and a pilot part of an ACKnowledgement (ACK) signal, and will be only used by the ACK. Besides, in the foregoing current method, the base station also needs to reserve a time and frequency resource which is allocated for the user terminal to bear the RRI. In other words, the time and frequency resources reserved by the base station include not only the time and frequency resource for the data part and the pilot part of the ACK, but also the time and frequency resource for the RRI, which increases the overhead of the reserved resource distinctly, and further reduces the time and frequency resources that the base station could dynamically allocate for an uplink user data.

SUMMARY OF THE INVENTION

A method for allocating a time and frequency resource for an RRI is provided in the present invention, which can help the base station reduce the overhead of the time and frequency resource.

An embodiment of the present invention provides a method for allocating a time and frequency resource for an RRI, which includes: allocating codes for an RRI and other uplink control signaling, and multiplexing the RRI and other uplink control signaling in the same time and frequency resource in a code division manner.

An embodiment of the present invention further provides a device for allocating a time and frequency resource, which includes an allocating unit and a multiplexing unit. The allocating unit is configured to allocate codes for an RRI and other uplink control signaling. The multiplexing unit is configured to multiplex the RRI and other uplink control signaling in the same time and frequency resource in a code division manner.

An embodiment of the present invention further provides a base station, which includes an allocating unit and a multiplexing unit. The allocating unit is configured to allocate codes for an RRI and other uplink control signaling. The multiplexing unit is configured to multiplex the RRI and other uplink control signaling in the same time and frequency resource in a code division manner.

In the embodiments of the present invention, the time and frequency resource for the RRI and other uplink control signaling are multiplexed in the same time and frequency resource, without allocating additional time and frequency resource for the RRI, thereby reducing the overhead of the time and frequency resource.

BRIEF DESCRIPTION OF THE DRAWINGS

FIG. 9 is a flow chart of a fifth embodiment of the present invention;

DETAILED DESCRIPTION OF THE EMBODIMENTS

Figure 1:
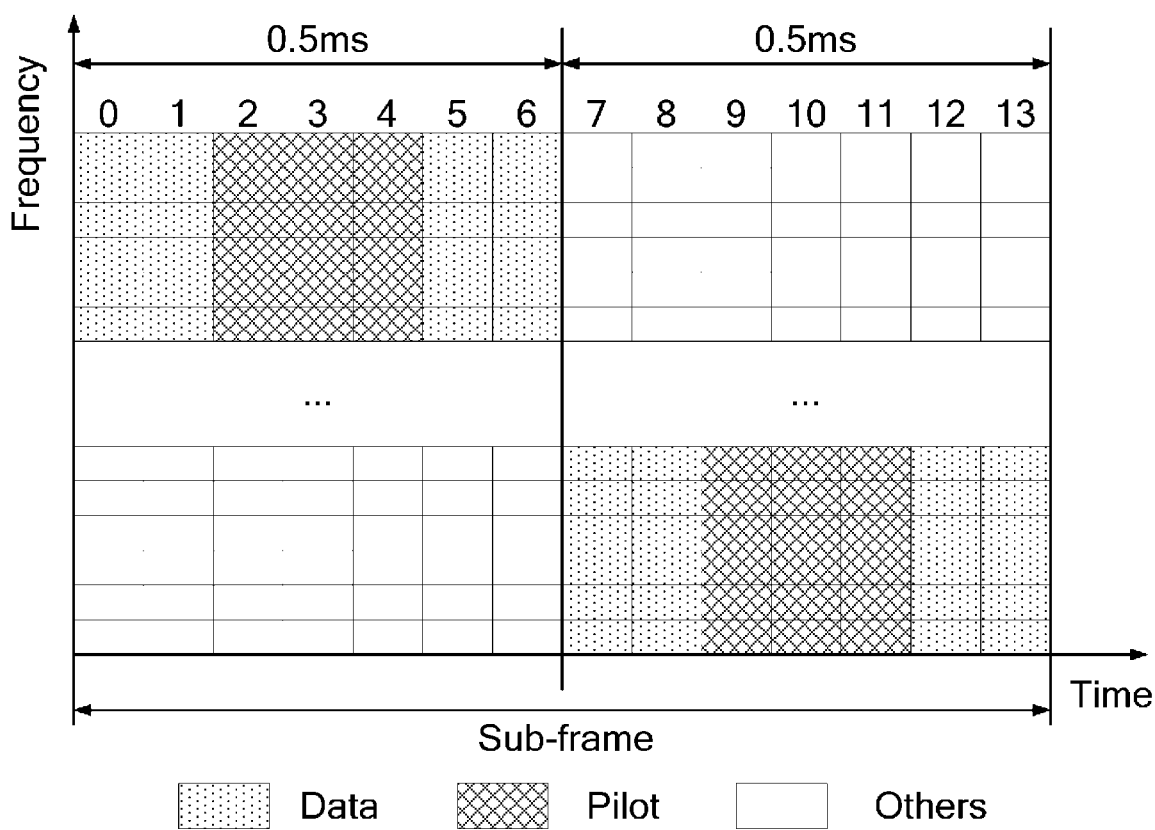
FIG. 1 is a schematic structural view of an uplink ACK resource in the conventional art.

The present invention provides a method for allocating a time and frequency resource for an RRI, which includes: allocating codes for an RRI and other uplink control signaling, and multiplexing the RRI and other uplink control signaling in the same time and frequency resource in a code division manner. For example, the other uplink control signaling includes an ACK.

In one aspect of the present invention, extended manners in time domain and frequency domain corresponding to the codes allocated for the RRI are respectively the same as extended manners in time domain and frequency domain corresponding to the codes allocated for a data part of the ACK, and the codes allocated for the RRI are orthogonal with the codes allocated for the data part of the ACK in time domain and/or frequency domain.

Further, the RRI and the ACK may be multiplexed in the same time and frequency resource in the following manner, that is, the time and frequency resource on which the RRI is sent is the same as the time and frequency resource on which the data part of the ACK is sent.

In another aspect of the present invention, extending manners in time domain and frequency domain corresponding to the codes allocated for the RRI are respectively the same as extended manners in time domain and frequency domain corresponding to the codes allocated for a pilot part of the ACK, and the codes allocated for the RRI are orthogonal with the codes allocated for the pilot part of the ACK in time domain and/or frequency domain.

Further, the RRI and the ACK may be multiplexed in the same time and frequency resource in the following manner, that is, the time and frequency resource on which the RRI is sent is the same as the time and frequency resource on which the pilot part of the ACK is sent.

In another aspect of the present invention, in a first time slot of one transmission time interval, extended manners in time domain and frequency domain corresponding to the codes allocated for the RRI are respectively the same as extended manners in time domain and frequency domain corresponding to the codes allocated for a pilot part of the ACK, and the codes allocated for the RRI are orthogonal with the codes allocated for the pilot part of the ACK in time domain and/or frequency domain. Besides, in a second time slot of the transmission time interval, extended manners in time domain and frequency domain corresponding to the codes allocated for the RRI are respectively the same as extended manners in time domain and frequency domain corresponding to the codes allocated for the data part of the ACK, and the codes allocated for the RRI are orthogonal with the codes allocated for the data part of the ACK in time domain and/or frequency domain.

Further, the RRI and the ACK may be multiplexed in the same time and frequency resource in the following manner, that is, in the first time slot of the transmission time interval, the time and frequency resource on which the RRI is sent is the same as the time and frequency resource on which the pilot part of the ACK is sent, and in the second time slot of the transmission time interval, the time and frequency resource on which the RRI is sent is the same as the time and frequency resource on which the data part of the ACK is sent.

In another aspect of the present invention, in a first time slot of one transmission time interval, extended manners in time domain and frequency domain corresponding to the codes allocated for the RRI are respectively the same as extended manners in time domain and frequency domain corresponding to the codes allocated for a data part of the ACK, and the codes allocated for the RRI are orthogonal with the codes allocated for the data part of the ACK in time domain and/or frequency domain. Besides, in a second time slot of the transmission time interval, extended manners in time domain and frequency domain corresponding to the codes allocated for the RRI are respectively the same as extended manners in time domain and frequency domain corresponding to the codes allocated for the pilot part of the ACK, and the codes allocated for the RRI are orthogonal with the codes allocated for the pilot part of the ACK in time domain and/or frequency domain.

Further, the RRI and the ACK may be multiplexed in the same time and frequency resource in the following manner, that is, in the first time slot of the transmission time interval, the time and frequency resource on which the RRI is sent is the same as the time and frequency resource on which the data part of the ACK is sent, and in the second time slot of the transmission time interval, the time and frequency resource on which the RRI is sent is the same as the time and frequency resource on which the pilot part of the ACK is sent.

In another aspect of the present invention, if there are two codes allocated for one user terminal in one time slot, extended manners in time domain and frequency domain corresponding to one code allocated for the RRI are respectively the same as extended manners in time domain and frequency domain corresponding to the code allocated for the pilot part of the ACK, and the code allocated for the RRI is orthogonal with the code allocated for the pilot part of the ACK in time domain and/or frequency domain. Besides, extended manners in time domain and frequency domain corresponding to the other code allocated for the RRI are respectively the same as extended manners in time domain and frequency domain corresponding to the code allocated for the data part of the ACK, and the other code allocated for the RRI is orthogonal with the code allocated for the data part of the ACK in time domain and/or frequency domain.

Further, the RRI and the ACK may be multiplexed in the same time and frequency resource in the following manner, that is, the time and frequency resource corresponding to one code on which the RRI is sent is the same as the time and frequency resource on which the pilot part of the ACK is sent, and the time and frequency resource corresponding to the other code on which the RRI is sent is the same as the time and frequency resource on which the data part of the ACK is sent.

In another aspect of the present invention, extended manners in frequency domain corresponding to the codes allocated for the RRI are the same as extended manners in frequency domain corresponding to the codes allocated for a data part and a pilot part of other uplink control signaling, and the codes allocated for the RRI are orthogonal with the codes allocated for the data part and the pilot part of other uplink control signaling in frequency domain.

Further, the RRI and the ACK may be multiplexed in the same time and frequency resource in the following manner, that is, the time and frequency resources on which the RRI is sent are the same as the time and frequency resources on which the data part and the pilot part of the ACK are sent.

Figure 11:
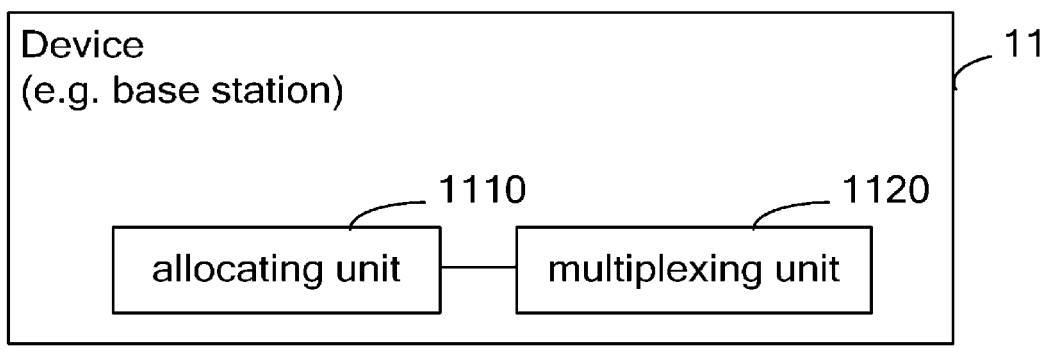
FIG. 11 is schematic view of a device for allocating a time and frequency resource of a resource request indicator according to an embodiment of the invention.

The methods provided by the foregoing embodiments of the present invention may be realized by using at least one device. For example, as shown in FIG. 11, a device 11 for allocating a time and frequency resource of an RRI includes an allocating unit 1110 and a multiplexing unit 1020. The allocating unit 1110 is configured to allocate codes for an RRI and other uplink control signaling. The multiplexing unit 1120 is configured to multiplex the RRI and the other uplink control signaling in the same time and frequency resource in a code division manner.

The device may be applied to a base station, and an embodiment of the present invention further provides a base station, which includes an allocating unit and a multiplexing unit. The allocating unit is configured to allocate codes for an RRI and other uplink control signaling. The multiplexing unit is configured to multiplex the RRI and the other uplink control signaling in the same time and frequency resource in a code division manner.

An embodiment that provides a method for allocating the time and frequency resource for the RRI includes: codes adapted to bear the RRI for the user terminals are selected from a code collection determined according to the time and frequency resources allocated for an ACK signal. Then, the selected codes are allocated for the user terminals, and the user terminals are assigned to send the RRI on the time and frequency resource allocated for the ACK.

Alternatively, before the codes adapted to bear the RRI are selected for the user terminals, the embodiment may further include that the number of the codes adapted to bear the RRI is determined.

Further, the codes adapted to bear the RRI, the number of which does not exceed the determined number of the codes adapted to bear the RRI, may be selected for the user terminals from all the codes that are not allocated for the ACK.

Alternatively, before the codes adapted to bear the RRI are selected for the user terminals, the embodiment may further include that all the codes adapted to bear the RRI is determined.

Further, the codes adapted to bear the RRI may be selected for the user terminals from all the codes that could be adapted to bear the RRI.

In the embodiments of the present invention, the codes adapted to bear the RRI may be the codes that are not allocated for the ACK in a code collection. Alternatively, the code collection may be determined according to a pilot time and frequency resource allocated for the ACK, or a data time and frequency resource allocated for the ACK.

If a plurality of user terminals is allocated with the same codes, each user terminal is assigned to send the RRI at a different time point.

Another embodiment provides a method for sending an RRI includes: Codes adapted to bear the RRI and time points for sending the RRI are obtained, and the codes adapted to bear the RRI are selected from a code collection determined according to time and frequency resources allocated for an ACK signal. When there's data waiting to be sent, the codes adapted to bear the RRI are sent on the time and frequency resource allocated for the ACK at the obtained time points.

Further, if the time point obtained is reached and the ACK needs to be sent at the same time, the ACK may not be sent, or the codes adapted to bear the RRI may not be sent or delayed to be sent.

Further, in the embodiment, the time point may be a periodic time point. In this case, if the time point obtained is reached and the ACK needs to be sent at the same time, the embodiment may further include: sending the codes adapted to bear the RRI at one or more subsequent periodic time points.

Another embodiment provides a method for dealing with an RRI, and the embodiment includes: the codes adapted to bear the RRI sent by user terminals on time and frequency resources allocated for an ACK at assigned time point are received, and the codes adapted to bear the RRI are detected to determine the user terminal that sends the codes. In the embodiment, the codes adapted to bear the RRI are the codes selected from a code collection and allocated for the user terminals. The code collection is determined according to the time and frequency resource allocated for the ACK. The assigned time point is the time points pre-assigned for the user terminals to send the RRI.

To allocate a time and frequency resource for an ACK which is mentioned in the foregoing embodiments is described below.

In an OFDM/OFDMA wireless communication system, a base station allocates or reserves one common time and frequency resource for ACK channels of a plurality of user terminals. On the common time and frequency resource, the ACK channels of the plurality of user terminals at one time point (for example, in one sub-frame) may be multiplexed in a code division manner, and the ACK channels of different user terminals may be differentiated through different codes.

The common time and frequency resource may be further divided into a time and frequency resource used by the pilot part of the ACK (hereafter briefly referred to as the pilot time and frequency resource) and a time and frequency resource used by the data part of the ACK (hereafter briefly referred to as the data time and frequency resource). In each time slot, the pilot time and frequency resource occupies several OFDM symbols, and the data time and frequency resource occupies the other several OFDM symbols. The pilot time and frequency resource is adapted to bear the pilot part of the ACK, and the pilot parts of the ACKs of different user terminals are differentiated through different codes. The data time and frequency resource is adapted to bear the data part, and the data parts of the ACKs of different user terminals are differentiated through different codes. In addition, as for the uplink ACK transmission, the number of the codes accommodated in the pilot time and frequency resource equals to the number of the user terminals accommodated in the pilot time and frequency resource. The number of codes accommodated in the data time and frequency resource equals to the number of the user terminals accommodated in the data time and frequency resource.

In time domain, the ACK channel of each user terminal occupies one sub-frame which includes two time slots, and the information in the two time slots may be the same. In frequency domain, the ACK channel of each user terminal occupies two time slots of the sub-frame in a frequency hopping manner. FIG. 1 is a schematic structural view of an uplink ACK resource. The OFDM symbols occupied by the pilot time and frequency resource and the data time and frequency resource may be determined according to the actual situations, and the structure as shown in FIG. 1 is only one of the structures.

If the base station receives the pilot parts of the ACKs of all the user terminals, it differentiates the pilot parts of the ACKs of different user terminals through the different codes. Since the data parts of the ACKs are sent in a coherent detection manner, the base station demodulates the data parts of the ACKs on the data time and frequency resource through the pilot parts of the ACKs. That is, the base station obtains the data parts of the ACKs corresponding to the user terminals on the data time and frequency resource, based on the pilot parts of the ACKs of the user terminals.

The following embodiments of the present invention provide some examples of the foregoing embodiments with the details.

Figure 2:
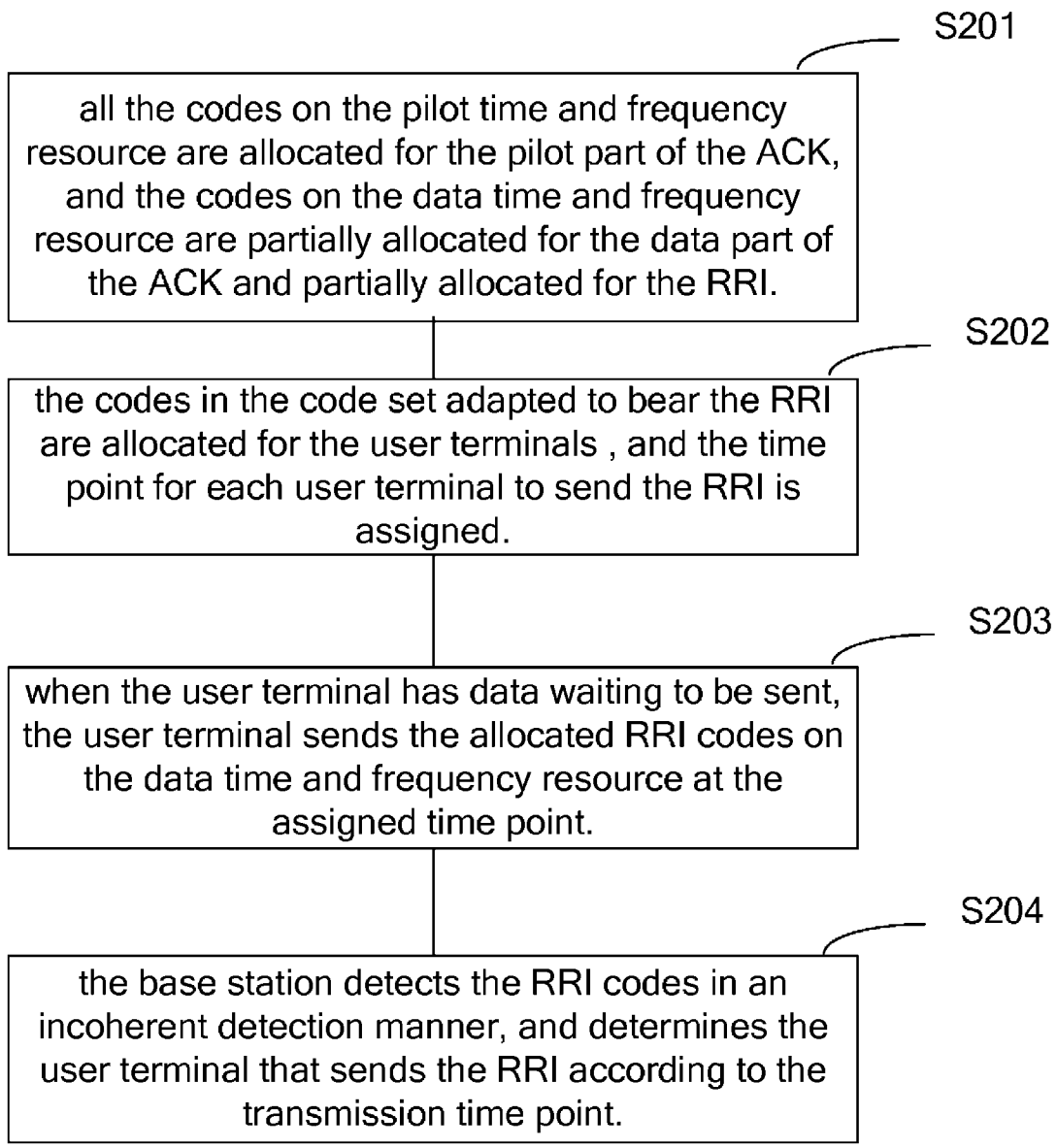
FIG. 2 is a flow chart of a first embodiment of the present invention.

FIG. 2 is a flow chart of a first embodiment of the present invention. As shown in FIG. 2, the first embodiment provides a method including the following steps S201 to S204.

In Step S201, all the codes on the pilot time and frequency resource are allocated for the pilot part of the ACK, and the codes on the data time and frequency resource are partially allocated for the data part of the ACK and partially allocated for the RRI. The codes on the data time and frequency resource adopt the same extended manners in time domain and frequency domain, and are orthogonal in time domain and/or frequency domain. The codes on the pilot time and frequency resource adopt the same extended manners in time domain and frequency domain, and are orthogonal in time domain and/or frequency domain.

Figure 3:
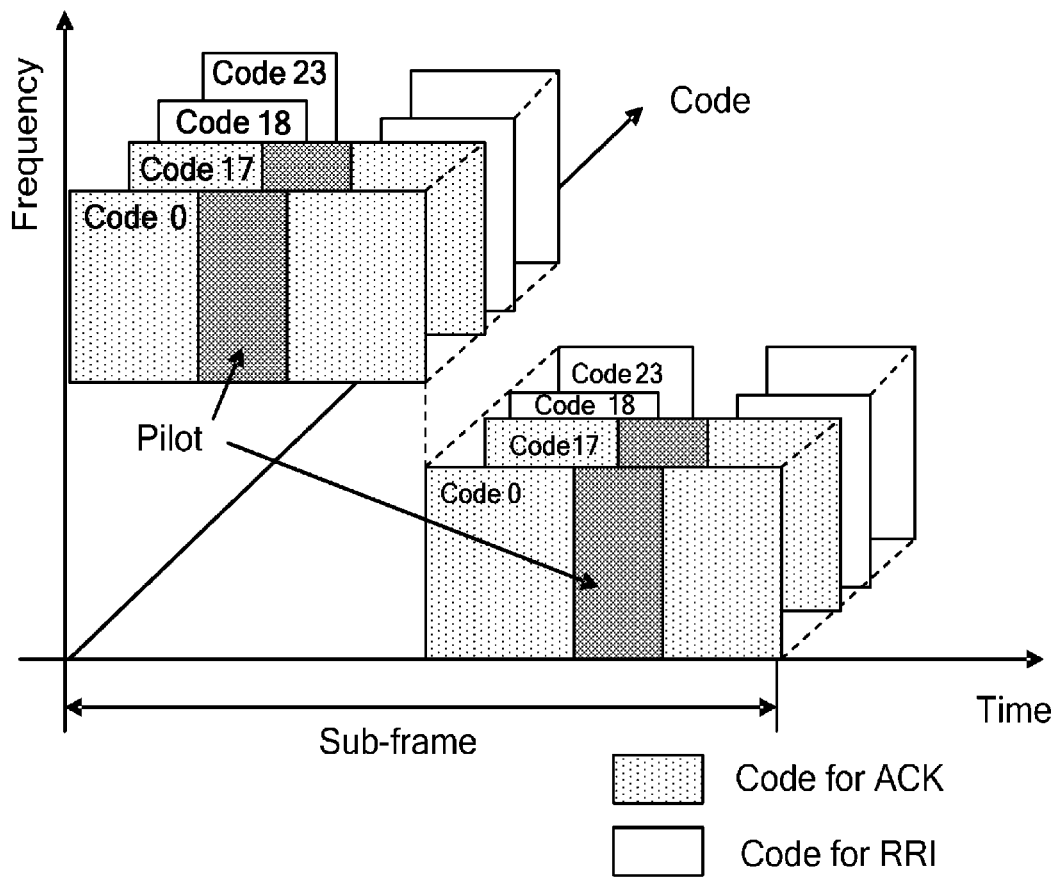
FIG. 3 is a schematic view of resource allocation according to the first embodiment of the present invention.

In this step, all the codes on the pilot time and frequency resource are allocated for the pilot part of the ACK, and the codes on the data time and frequency resource are divided into a code set adapted to bear the data part of the ACK and a code set adapted to bear the RRI. That is, the data part of the ACK and the RRI are multiplexed in the data time and frequency resource in a code division manner, and the time and frequency resource on which the RRI is sent is the same as the time and frequency resource on which the data part of the ACK is sent, but the respective corresponding codes are different. For example, in one time and frequency resource unit, the number of codes accommodated in the data time and frequency resource is 24, and the number of codes accommodated in the pilot time and frequency resource is 18. When all the codes on the pilot time and frequency resource are allocated for the pilot part of the ACK, the ACK channels are allocated for at most 18 user terminals. The other 6 codes of the data time and frequency resource may form a code set adapted to bear the RRI, that is, may be allocated for 6 user terminals. FIG. 3 is a schematic view of resource allocation.

Figure 4:
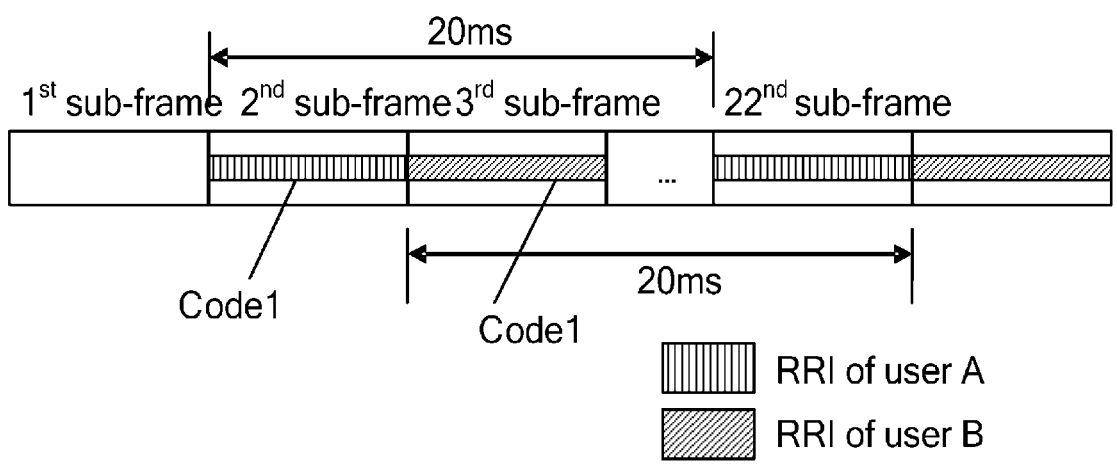
FIG. 4 is a schematic view of sending RRIs at assigned time points according to an embodiment of the present invention.

In Step S202, the codes in the code set adapted to bear the RRI are allocated for the user terminals (for example, voice over Internet protocol (VoIP) users), and the time point (sub-frame) for each user terminal to send the RRI is assigned. A plurality of user terminals may be allocated with the same code, and assigned with different sending time points. For example, as shown in FIG. 4, the base station respectively allocates an RRI code for the user terminals A and B, and the RRI code for the user terminal A is the same as the RRI code for the user terminal B, which is code1. The sending period of the user terminal A is the same as the sending period of the user terminal B, which is 20 ms (or 20 sub-frames, 1 ms/sub-frame). The base station assigns the user terminal A to send the RRI at a second frame, and assigns the user terminal B to send the RRI at a third frame.

The embodiment only including Step S201 and Step S202 provides the method for resource allocation. When there's data waiting to be sent at the user terminal, the user terminal sends an RRI to the base station, and then the base station processes the RRI. An embodiment of the method for sending the RRI and an embodiment of the method for processing the RRI are respectively introduced through Step S203 and Step S204 as follows.

In Step S203, when the user terminal has data waiting to be sent, the user terminal sends the allocated RRI codes on the data time and frequency resource at the assigned time point (sub-frame). If the user terminal has the data part of the ACK to be sent at the same time, the user terminal may delay sending the RRI until the subsequent time point (sub-frame) assigned by the base station, or may not send the RRI.

In Step S204, after receiving the RRI, the base station detects the RRI codes in an incoherent detection manner, and determines the user terminal that sends the RRI according to the transmission time point (sub-frame). For example, at a 22nd frame in FIG. 4, the base station detects the code1, and then determines that it is the user terminal A that sends the code1.

Figure 5:
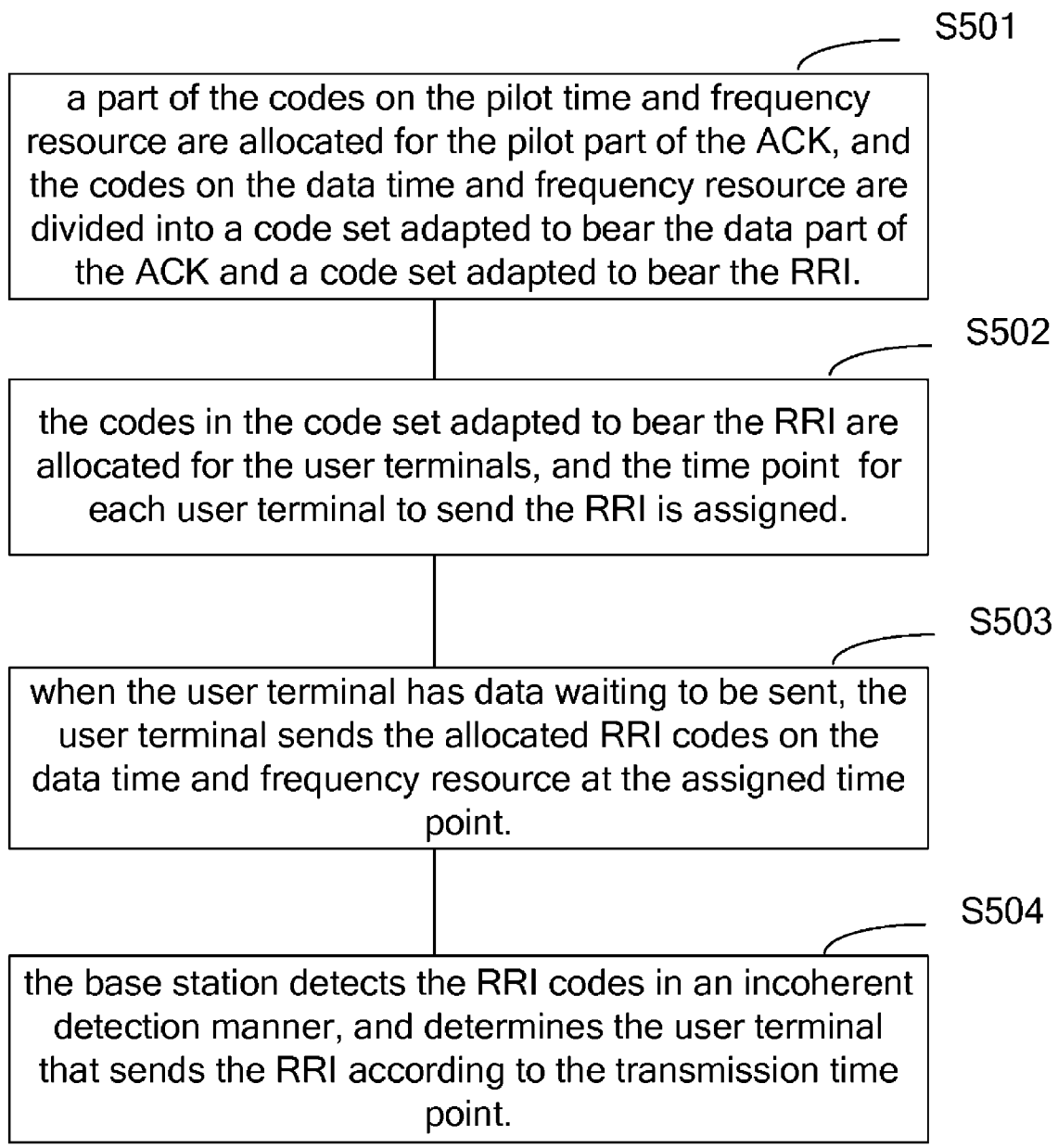
FIG. 5 is a flow chart of a second embodiment of the present invention.

FIG. 5 is a flow chart of a second embodiment of the present invention. As shown in FIG. 5, the second embodiment provides a method including the following steps S501 to S504.

In Step S501, a part of the codes on the pilot time and frequency resource are allocated for the pilot part of the ACK, and the codes on the data time and frequency resource are divided into a code set adapted to bear the data part of the ACK and a code set adapted to bear the RRI. The codes on the data time and frequency resource adopt the same extended manners in time domain and frequency domain, and are orthogonal in time domain and/or frequency domain. The codes on the pilot time and frequency resource adopt the same extended manners in time domain and frequency domain and are orthogonal in time domain and/or frequency domain. The data part of the ACK and the RRI are multiplexed in the data time and frequency resource in a code division manner, and the time and frequency resource on which the RRI is sent is the same as the time and frequency resource on which the data part of the ACK is sent, but the respective corresponding codes are different. For example, in one time and frequency resource unit, the number of codes accommodated in the data time and frequency resource is 24, and the number of codes accommodated in the pilot time and frequency resource is 18. If 10 codes on the pilot time and frequency resource are allocated for the pilot part of the ACK, that is, the ACK channels are allocated for 10 user terminals in one time and frequency resource unit. Correspondingly, there are 14 codes on the data time and frequency resource in the code set adapted to bear the RRI. In addition, if there are the codes on the pilot time and frequency resource that are not allocated, such codes will not be allocated for the user terminals to use.

In Step S502, the codes in the code set adapted to bear the RRI are allocated for the user terminals (for example, VoIP users), and the time point (sub-frame) for each user terminal to send the RRI is assigned. For example, the base station allocates the code1 for the VoIP user terminal A as the RRI code, instructs that a sending period is 20 ms (or 20 frames, 1 ms/sub-frame), and assigns the VoIP user terminal A to send the RRI at a second frame.

The embodiment only including Step S501 and Step S502 provides the method for resource allocation. When there's data waiting to be sent at the user terminal, the user terminal sends the RRI to the base station, and then the base station processes the RRI. An embodiment of the method for sending the RRI and an embodiment of the method for processing the RRI are respectively introduced through Step S503 and Step S504 as follows.

In Step S503, when the user terminal has data waiting to be sent, the user terminal sends the allocated RRI codes on the data time and frequency resource at the assigned time point (sub-frame). If the user terminal has the data part of the ACK to be sent at the same time, the user terminal may delay sending the RRI until the subsequent time point (sub-frame) assigned by the base station, or may not send the RRI.

In Step S504, after receiving the RRI, the base station detects the RRI codes in an incoherent detection manner, and determines the user terminal that sends the RRI according to the transmission time point (sub-frame). For example, at the 22nd frame in FIG. 4, the base station detects the code1, and then determines that it is the user terminal A that sends the code1.

Figure 6:
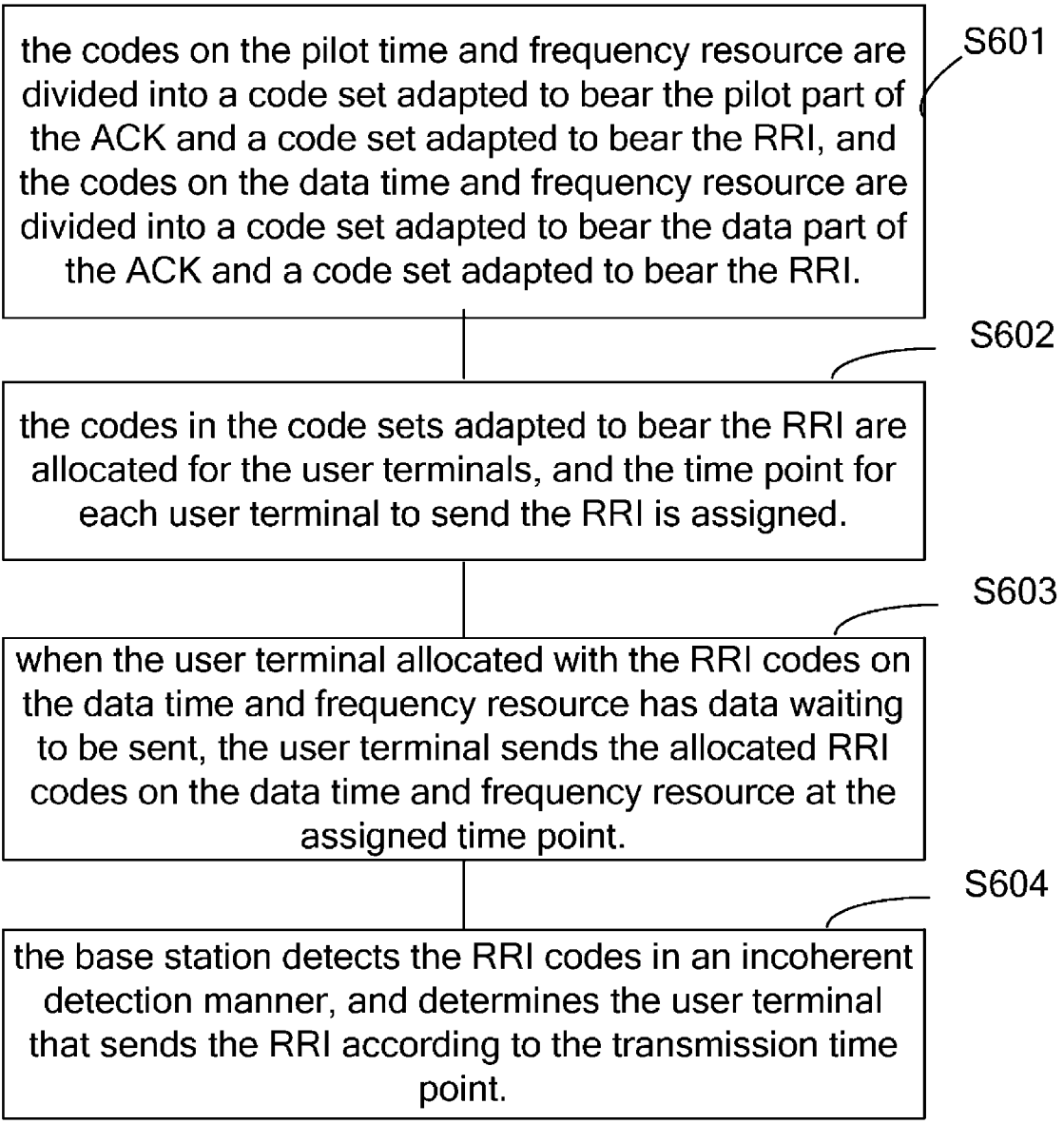
FIG. 6 is a flow chart of a third embodiment of the present invention.

FIG. 6 is a flow chart of a third embodiment of the present invention. As shown in FIG. 6, the third embodiment provides a method including the following steps S601 to S604.

In Step S601, the codes on the pilot time and frequency resource are divided into a code set adapted to bear the pilot part of the ACK and a code set adapted to bear the RRI, and the codes on the data time and frequency resource are divided into a code set adapted to bear the data part of the ACK and a code set adapted to bear the RRI. The codes on the data time and frequency resource adopt the same extended manners in time domain and frequency domain, and are orthogonal in time domain and/or frequency domain. The codes on the pilot time and frequency resource adopt the same extended manners in time domain and frequency domain, and are orthogonal in time domain and/or frequency domain. The pilot part of the ACK and the RRI are multiplexed in the pilot time and frequency resource in a code division manner, and the time and frequency resource on which the RRI is sent is the same as the time and frequency resource on which the pilot part of the ACK is sent, but the respective corresponding codes are different. The data part of the ACK and the RRI are multiplexed in the data time and frequency resource in the code division manner, and the time and frequency resource on which the RRI is sent is the same as the time and frequency resource on which the data part of the ACK is sent, but the respective corresponding codes are different. For example, in one time and frequency resource unit, the number of codes accommodated in the data time and frequency resource is 24, and the number of codes accommodated in the pilot time and frequency resource is 18. If 10 codes on the pilot time and frequency resource are allocated for the pilot part of the ACK, that is, the ACK channels are allocated for 10 user terminals in one time and frequency resource unit. Correspondingly, there are 14 codes on the data time and frequency resource in the code set adapted to bear the RRI, and the other 8 codes on the pilot time and frequency resource may be the codes adapted to bear the RRI.

In Step S602, the codes in the code sets adapted to bear the RRI are allocated for the user terminals, and the time point (sub-frame) for each user terminal to send the RRI is assigned.

The embodiment only including Step S601 and Step S602 provides a method for resource allocation. When there's data waiting to be sent at the user terminal, the user terminal sends the RRI to the base station, and then the base station processes the RRI. An embodiment of the method for sending the RRI and an embodiment of the method for processing the RRI are introduced respectively through Step S603 and Step S604 as follows.

In Step S603, when the user terminal allocated with the RRI codes on the data time and frequency resource has data waiting to be sent, the user terminal sends the allocated RRI codes on the data time and frequency resource at the assigned time point (sub-frame). If the user terminal has the data part of the ACK to be sent at the same time, the user terminal may delay sending the RRI until the subsequent time point (sub-frame) assigned by the base station, or may not send the RRI.

When the user terminal allocated with the RRI codes on the pilot time and frequency resource has data waiting to be sent, the user terminal sends the allocated RRI codes on the pilot time and frequency resource at the assigned time point (sub-frame). If the user terminal has the pilot part of the ACK to be sent at the same time, the user terminal may delay sending the RRI until the subsequent time point (sub-frame) assigned by the base station, and definitely may not send the RRI.

In Step S604, after receiving the RRI, the base station detects the RRI codes in an incoherent detection manner, and determines the user terminal that sends the RRI according to the transmission time point (sub-frame).

Figure 7:
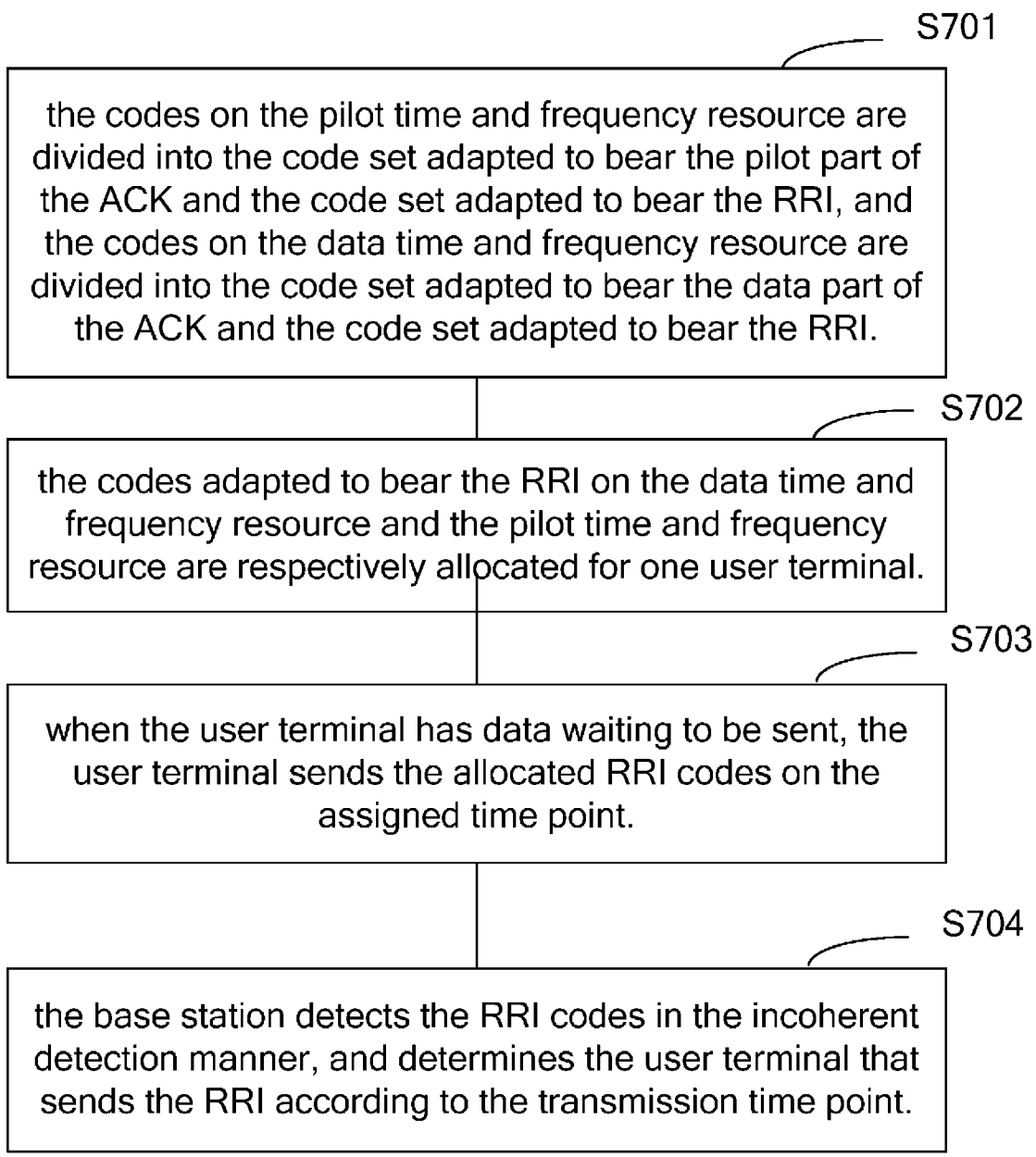
FIG. 7 is a flow chart of a fourth embodiment of the present invention.

FIG. 7 is a flow chart of a fourth embodiment of the present invention. As shown in FIG. 7, the fourth embodiment provides a method including the following steps S701 to S704.

In Step S701, the codes on the pilot time and frequency resource are divided into the code set adapted to bear the pilot part of the ACK and the code set adapted to bear the RRI, and the codes on the data time and frequency resource are divided into the code set adapted to bear the data part of the ACK and the code set adapted to bear the RRI. The codes on the data time and frequency resource adopt the same extended manners in time domain and frequency domain, and are orthogonal in time domain and/or frequency domain. The codes on the pilot time and frequency resource adopt the same extended manners in time domain and frequency domain, and are orthogonal in time domain and/or frequency domain. The pilot part of the ACK and a part of the RRI are multiplexed in the pilot time and frequency resource in a code division manner, and the time and frequency resource on which the part of the RRI is sent is the same as the time and frequency resource on which the pilot part of the ACK is sent, but the respective corresponding codes are different. The data part of the ACK and the other part of the RRI are multiplexed in the data time and frequency resource in the code division manner, and the time and frequency resource on which the other part of the RRI is sent is the same as the time and frequency resource on which the data part of the ACK is sent, but the respective corresponding codes are different. For example, in one time and frequency resource unit, the number of codes accommodated in the data time and frequency resource is 24, and the number of codes accommodated in the pilot time and frequency resource is 18. If 10 codes on the pilot time and frequency resource may be allocated for the pilot part of the ACK, that is, the ACK channels are allocated for 10 user terminals in one time and frequency resource unit. Correspondingly, there are 14 codes on the data time and frequency resource in the code set adapted to bear the RRI, and the other 8 codes on the pilot time and frequency resource may be the codes adapted to bear the RRI.

Figure 8:
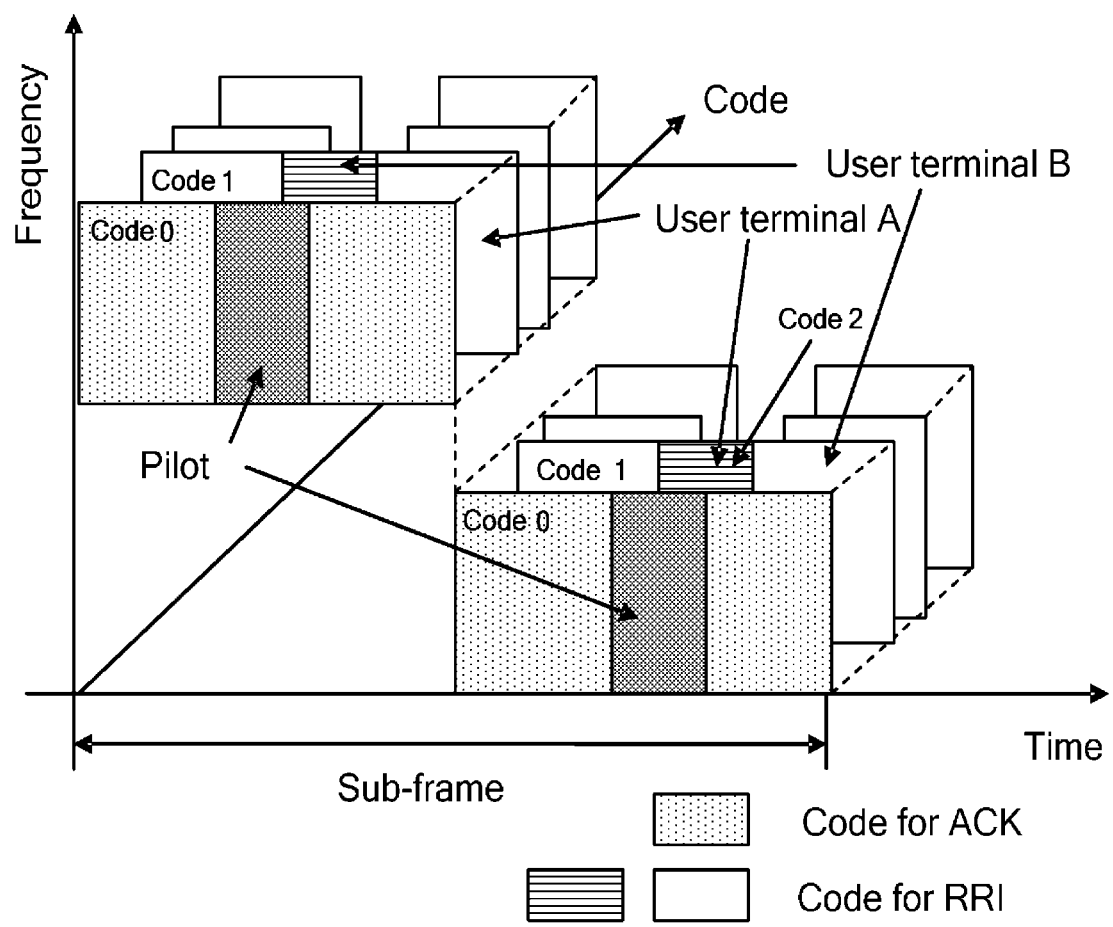
FIG. 8 is a schematic view of resource allocation according to the fourth embodiment of the present invention.

In Step S702, the codes adapted to bear the RRI on the data time and frequency resource and the pilot time and frequency resource are respectively allocated for one user terminal (for example, VoIP user), and the user terminal is assigned to send the RRI at different time slots of one time point (sub-frame). As shown in FIG. 8, the base station allocates the code1 adapted to bear the RRI on the data time and frequency resource for the VoIP user terminal A, and assigns the user terminal A to send the RRI on the data time and frequency resource in a former time slot. Besides, the base station also allocates the code2 adapted to bear the RRI on the pilot time and frequency resource for the user terminal A, and assigns the user terminal A to send the RRI on the pilot time and frequency resource in a latter time slot. In addition, the base station instructs that the sending period of the user terminal A is 20 ms (or 20 frames, 1 ms/frame), and the RRI is sent at a second frame. Alternatively, the base station allocates the code1 adapted to bear the RRI on the data time and frequency resource for the VoIP user terminal B, and assigns the user terminal B to send the RRI on the data time and frequency resource in the latter time slot. Besides, the base station also allocates the code2 adapted to bear the RRI on the pilot time and frequency resource for the user terminal B, and assigns the user terminal B to send the RRI on the pilot time and frequency resource in the former time slot. In addition, the base station further instructs that the sending period of the user terminal B is 20 ms (or 20 frames, 1 ms/frame), and the RRI is sent at the second frame.

The embodiment only including Step S701 and Step S702 provides the method for resource allocation. When there's data waiting to be sent at the user terminal, the user terminal sends the RRI to the base station, and then the base station processes the RRI. An embodiment of the method for sending the RRI and an embodiment of the method for processing the RRI are respectively introduced through Step S703 and Step S704 as follows.

In Step S703, when the user terminal has data waiting to be sent, the user terminal sends the allocated RRI codes on the assigned time point. If the user terminal has an ACK to be sent at the same time, the user terminal may delay sending the RRI until the subsequent time point (sub-frame) assigned by the base station, or may not send the RRI.

In Step S704, after receiving the RRI, the base station detects the RRI codes in the incoherent detection manner, and determines the user terminal that sends the RRI according to the transmission time point (sub-frame).

FIG. 9 is a flow chart of a fifth embodiment of the present invention. As shown in FIG. 9, the fifth embodiment provides a method including the following steps S901 to S904.

In Step S901, the codes on the pilot time and frequency resource are divided into the code set adapted to bear the pilot part of the ACK and the code set adapted to bear the RRI, and the codes on the data time and frequency resource are divided into the code set adapted to bear the data part of the ACK and the code set adapted to bear the RRI. The codes on the data time and frequency resource adopt the same extended manners in time domain and frequency domain, and are orthogonal in time domain and/or frequency domain. The codes on the pilot time and frequency resource adopt the same extended manners in time domain and frequency domain, and are orthogonal in time domain and/or frequency domain. The pilot part of the ACK and a part of the RRI are multiplexed in the pilot time and frequency resource in the code division manner, and the time and frequency resource on which the part of the RRI is sent is the same as the time and frequency resource on which the pilot part of the ACK is sent, but the respective corresponding codes are different. The data part of the ACK and the other part of the RRI are multiplexed in the data time and frequency resource in the code division manner, and the time and frequency resource on which the other part of the RRI is sent is the same as the time and frequency resource on which the data part of the ACK is sent, but the respective corresponding codes are different.

Figure 10:
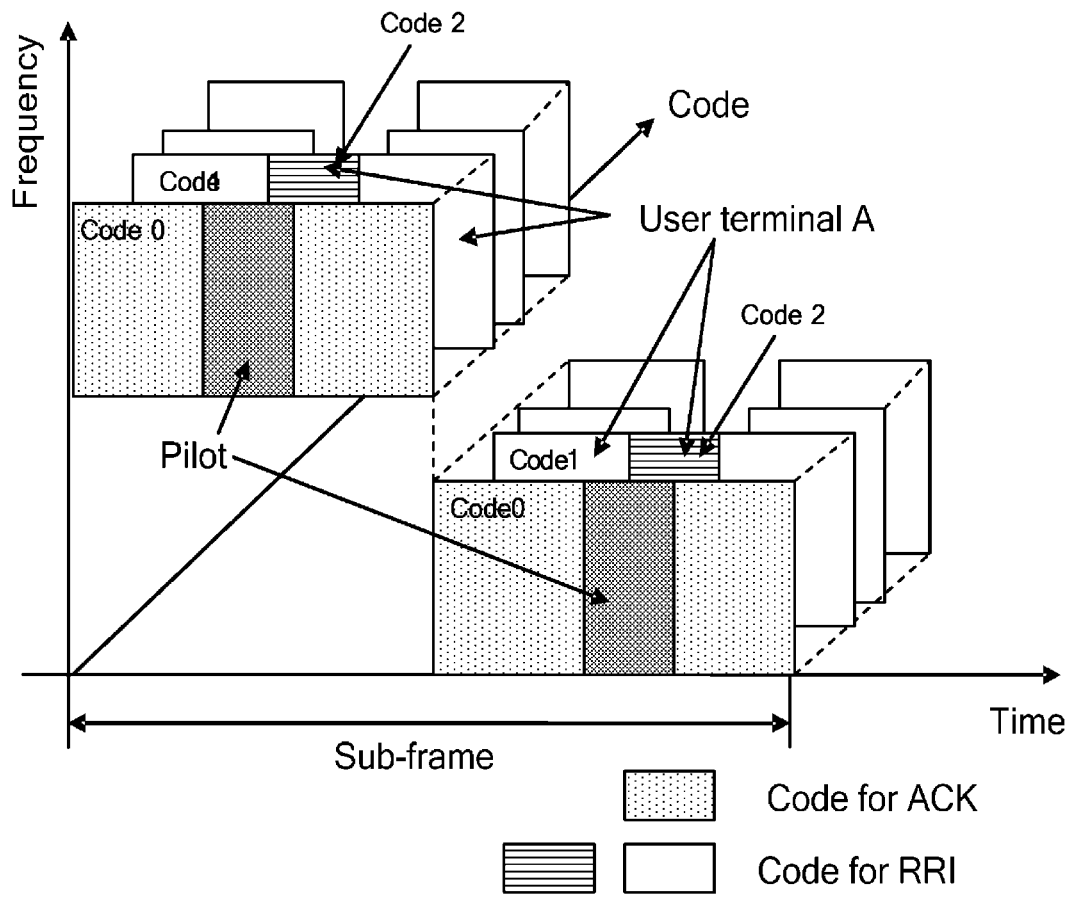
FIG. 10 is a schematic view of resource allocation according to the fifth embodiment of the present invention.

In Step S902, the codes adapted to bear the RRI on the data time and frequency resource and the pilot time and frequency resource are respectively allocated for one user terminal, and the user terminal is assigned to send the RRI on both the data time and frequency resource and the pilot time and frequency resource, which is also called the whole data and pilot time and frequency resources, at the assigned time point. As shown in FIG. 10, the base station respectively allocates the code1 on the data time and frequency resource and the code2 on the pilot time and frequency resource for the VoIP user terminal A as the RRI code, and instructs that the sending period is 20 ms (or 20 frame, 1 ms/frame), and assigns the VoIP user terminal A to send the RRI at the second frame.

The embodiment only including Step S901 and Step S902 provides the method for resource allocation. When there's data waiting to be sent at the user terminal, the user terminal sends the RRI to the base station, and then the base station processes the RRI. An embodiment of the method for sending the RRI and an embodiment of the method for processing the RRI are introduced respectively through Step S903 and Step S904 as follows.

In Step S903, when the user terminal has data waiting to be sent, the user terminal sends the allocated RRI codes on the assigned time point. If the user terminal has the ACK to be sent at the same time, the user terminal may delay sending the RRI until the subsequent time point (sub-frame) assigned by the base station, or may not send the RRI.

In Step S904, after receiving the RRI, the base station detects the RRI codes in the incoherent detection manner, and determines the user terminal that sends the RRI according to the transmission time point (sub-frame).

In the foregoing embodiments of the present invention, the user terminals and the channels on the same time and frequency resource are multiplexed as many as possible, thus, the overhead of the time and frequency resource is reduced. The number of the user terminals and channels that can be multiplexed at the same time depends on the number of the obtained time and frequency two-dimensional code sequences, and the extension of the code sequences in time domain depends on the number of the OFDM symbols available in time domain.

In the foregoing fifth embodiment, one user terminal sends the RRI on both the data resources and the pilot resources at the assigned time point. If the extended codes, in frequency domain, of the codes on the pilot time and frequency resource and the extended codes of the codes on the data time and frequency resource are the same, the base station may support more user terminals to be multiplexed at the same time in the way as follows. The same extended codes, in frequency domain, on the pilot time and frequency resource and the data time and frequency resource may be divided into frequency domain code set adapted to bear the ACK and frequency domain code set adapted to bear the RRI. Then, one of frequency domain code sets adapted to bear the RRI on the data time and frequency resource and the pilot time and frequency resource is allocated for one user terminal, and then an unified time domain extension is performed on the whole available data and pilot time domain resources (OFDM symbols in time domain). Besides, the user terminal is instructed to send the RRI on both the data resources and the pilot resources, which is also called the whole data and pilot time and frequency resources, at the assigned time point.

For example, a time and frequency resource is shown in FIG. 1. In time domain, one sub-frame includes two time slots and the information borne by the latter time slot may be a repetition of the information borne by the former time slot. In one time slot, the pilot time and frequency resource and the data time and frequency resource occupy 3 and 4 OFDM symbols respectively. In one time and frequency resource unit, the number of the codes accommodated in the pilot time and frequency resource in one time slot is 18, which includes 6 frequency domain extended codes and 3 time domain extended codes. The number of codes accommodated in the data time and frequency resource is 24, which includes 6 frequency domain extended codes and 4 time domain extended codes. The 6 frequency domain extended codes on the pilot time and frequency resource are the same as the 6 frequency domain extended codes on the data time and frequency resource. Therefore, 3 identical frequency domain extended codes on the pilot time and frequency resource and the data time and frequency resource may be allocated for the ACK channels, and the other 3 identical frequency domain extended codes on the pilot time and frequency resource and the data time and frequency resource are allocated for the RRI. As for the ACK channels, a coherent detection manner is adopted, so that 3*3=9 code resources exist on 3 pilot symbols, and 3*4=12 code resources exist on 4 data symbols, so as to totally support 9 ACK channels. As for the RRI channels, an incoherent detection manner is adopted, and a unified time domain extension is performed on the whole available data and pilot time domain resources (7 OFDM symbols), so as to totally support 3*7=21 RRI channels. The foregoing method for multiplexing the RRI and the ACK in the code division manner is also applicable to multiplex the RRI and other uplink control channels (for example, channel quality indicator (CQI)) in a code division manner. That is, frequency domain extended manner corresponding to the codes allocated for the RRI is the same as frequency domain extended manner corresponding to the codes allocated for a data part and a pilot part of the CQI, and the codes allocated for the RRI are orthogonal with the codes allocated for the data part and the pilot part of the CQI in frequency domain.

The methods provided by the foregoing embodiments may be realized by the devices in various forms, and some embodiments of the device are introduced as follows.

An embodiment of a device 12 for allocating a time and frequency resource includes a selecting unit 1210, an allocating unit 1220, and a sending manner assigning unit 1230. The selecting unit 1210 is configured to select codes adapted to bear an RRI for user terminals from a code collection which is determined according to a time and frequency resource allocated for an ACK. The allocating unit 1220 is configured to allocate the codes selected by the selecting unit 1210 for the user terminals. The sending manner assigning unit 1230 is configured to assign the user terminals to send the RRI on the time and frequency resource allocated for the ACK.

The device in the foregoing embodiment may be applied to a base station, and accordingly, an embodiment of the present invention further provides a base station 13, which includes a selecting unit 1310, an allocating unit 1320, and a sending manner assigning unit 1330. The selecting unit 1310 is configured to select codes adapted to bear an RRI for user terminals from a code collection which is determined according to a time and frequency resource allocated for an ACK. The allocating unit 1320 is configured to allocate the codes selected by the selecting unit 1310 for the user terminals. The sending manner assigning unit 1330 is configured to assign the user terminals to send the RRI on the time and frequency resource allocated for the ACK.

An embodiment of a device 14 for sending an RRI includes an obtaining unit 1410 and a sending unit 1420. The obtaining unit 1410 is configured to obtain codes adapted to bear an RRI and time points for sending the RRI, in which the codes adapted to bear the RRI are codes selected from a code collection which is determined according to a time and frequency resource allocated for an ACK. The sending unit 1420 is configured to send the codes adapted to bear the RRI on the time and frequency resource allocated for the ACK at the time points obtained by the obtaining unit 1410, if there's data waiting to be sent.

The device in the foregoing embodiment may be applied to a terminal, and accordingly, an embodiment of the present invention provides a terminal 15, which includes an obtaining unit 1510 and a sending unit 1520. The obtaining unit 1510 is configured to obtain codes adapted to bear an RRI and time points for sending the RRI, in which the codes adapted to bear the RRI are codes selected from a code collection which is determined according to a time and frequency resource allocated for an ACK. The sending unit 1520 is configured to send the codes adapted to bear the RRI on the time and frequency resource allocated for the ACK at the time points obtained by the obtaining unit 1510 if there's data waiting to be sent.

Figure 12:
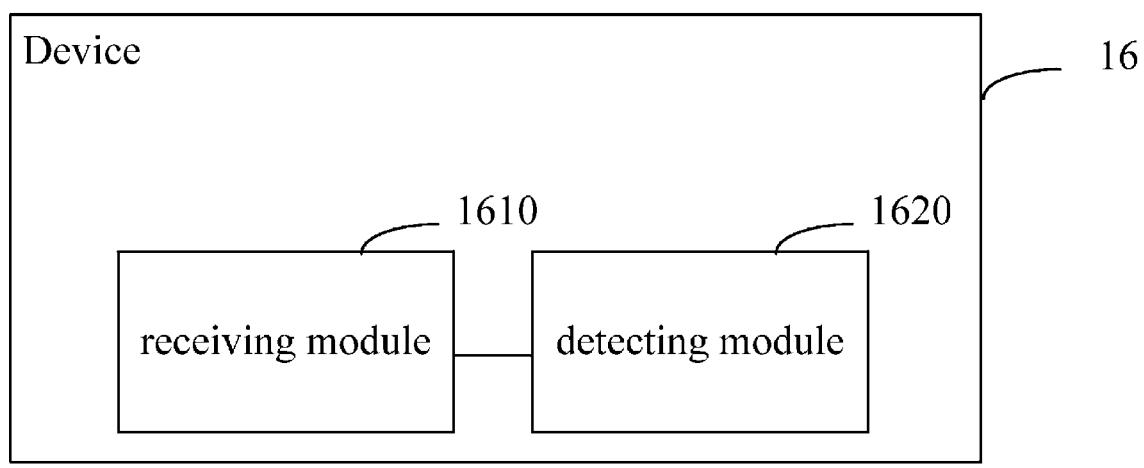
FIG. 12 is schematic view of a device for processing an RRI according to an embodiment of the invention.

An embodiment of a device 16 for processing an RRI includes a receiving module 1610 and a detecting module 1620 as shown in FIG. 12. The receiving module 1610 is configured to receive codes adapted to bear the RRI sent from user terminals on a time and frequency resource allocated for an ACK at assigned time points, in which the codes adapted to bear the RRI are codes selected from a code collection which is determined according to the time and frequency resource allocated for the ACK, and the assigned time points are time points pre-assigned for the user terminals to send the RRI. The detecting module 1620 is configured to detect the codes adapted to bear the RRI, so as to determine the user terminal that sends the codes.

The device in the foregoing embodiment may be applied to a base station, and accordingly, an embodiment of the present invention provides a base station 17, which includes a receiving module 1710 and a detecting module 1720. The receiving module 1710 is configured to receive codes adapted to bear an RRI sent from user terminals on a time and frequency resource allocated for an ACK at assigned time points, in which the codes adapted to bear the RRI are codes selected from a code collection which is determined according to the time and frequency resource allocated for the ACK, and the assigned time points are time points pre-assigned for the user terminals to send the RRI. The detecting module 1720 is configured to detect the codes adapted to bear the RRI, so as to determine the user terminal that sends the codes.

It should be noted that, in all the foregoing embodiments for allocating the time and frequency resource, the codes reserved for the ACK may be determined firstly, that is, the specific codes reserved for the ACK are determined at first, and then all or a part of the other codes are taken as the RRI codes. Alternatively, the number of the codes reserved for the ACK may be determined firstly, that is, how many codes reserved for the ACK instead of the specific codes reserved for the ACK is determined at first. When the RRI codes are allocated for the user terminals, any code that is not allocated for the ACK may be allocated for the user terminals, and the total number of the allocated RRI codes does not exceed a difference between the total number of all the codes and the number of the codes reserved for the ACK.

In all the foregoing embodiments for allocating the time and frequency resource, the signal which shares the time and frequency resource with the RRI may be other control signaling. For example, the time and frequency resource is shared by the CQI signal and the RRI.

The above various manners for allocating the time and frequency resource for the RRI may be combined to use. For example, one part of the code resources allocated for the RRI may adopt the manner of one embodiment, and the other part may adopt the manner of another embodiment.

In all the foregoing embodiments for allocating the time and frequency resource, if the number of the codes allocated for the RRI does not meet the demand of the user terminals, a part of the codes reserved for the ACK may be adjusted to serve as the RRI codes, or the number of the codes reserved for the ACK may be reduced, so that more codes are allocated for the RRI. In addition, the codes on the time and frequency resources other than the time and frequency resource allocated for the ACK may also serve as the RRI codes.

In all the foregoing embodiments for sending the RRI, if the RRI needs to be sent at the assigned time point, and the ACK needs to be sent at the same time, the ACK may be not sent.

In all the foregoing embodiments for processing the RRI, the base station may consider the detection result in each time slot of each time point (sub-frame), and determine the user terminal that sends the RRI or whether a certain user terminal sends the RRI at the time point or not.

Although the invention has been described through some exemplary embodiments, it is apparent that those skilled in the art can make various modifications and variations to the invention without departing from the scope of the invention. The invention is intended to cover the modifications and variations provided that they fall in the scope of protection defined by the following claims or their equivalents.

What is claimed is:

1. A method for allocating a time and frequency resource for a resource request indicator (RRI), comprising:
    allocating codes for the RRI and other uplink control signaling, to multiplex the RRI and the other uplink control signaling in the same time and frequency resource in a code division manner,
    wherein extended manners in time domain and frequency domain corresponding to a first part of the codes allocated for the RRI are respectively the same as extended manners in time domain and frequency domain corresponding to the codes allocated for a pilot part of the other uplink control signaling, and extended manners in time domain and frequency domain corresponding to a second part of the codes allocated for the RRI are respectively the same as extended manners in time domain and frequency domain corresponding to the codes allocated for a data part of the other uplink control signaling.

2. The method of claim 1, wherein the extended manners in time domain and frequency domain corresponding to the first part of the codes allocated for the RRI are respectively the same as the extended manners in the time domain and the frequency domain corresponding to the codes allocated for the pilot part of the other uplink control signaling, and the extended manners in the time domain and the frequency domain corresponding to the second part of the codes allocated for the RRI are respectively the same as the extended manners in the time domain and the frequency domain corresponding to the codes allocated for the data part of the other uplink control signaling, comprises:
    extended manners in time domain and frequency domain corresponding to a first code allocated for the RRI are respectively the same as extended manners in time domain and frequency domain corresponding to a code allocated for the pilot part of the other uplink control signaling, and the first code allocated for the RRI is orthogonal with the code allocated for the pilot part of the other uplink control signaling in at least one of the time domain and the frequency domain; and extended manners in time domain and frequency domain corresponding to a second code allocated for the RRI are respectively the same as extended manners in time domain and frequency domain corresponding to a code allocated for the data part of the other uplink control signaling, and the second code allocated for the RRI is orthogonal with the code allocated for the data part of the other uplink control signaling in at least one of the time domain and the frequency domain, wherein the first code and the second code are allocated for one user terminal in one time slot.

3. The method of claim 2, further comprising:
    the first code allocated for the RRI and the code allocated for the pilot part of the other uplink control signaling being sent in the same time and frequency resource; and
    the second code allocated for the RRI and the code allocated for the data part of the other uplink control signaling being sent in the same time and frequency resource.

4. The method of claim 1, the method further comprising:
    detecting the first part of the codes and the second part of the codes allocated for the RRI on the time and frequency resource in an incoherent detection manner.

5. The method of claim 1, wherein the other uplink control signaling is an acknowledgement signal.

6. An apparatus for allocating a time and frequency resource for a resource request indicator (RRI), comprising a processor, wherein the processor is configured to allocate codes for the RRI and other uplink control signaling, to multiplex the RRI and the other uplink control signaling in the same time and frequency resource in a code division manner,
    wherein extended manners in time domain and frequency domain corresponding to a first part of the codes allocated for the RRI are respectively the same as extended manners in time domain and frequency domain corresponding to the codes allocated for a pilot part of the other uplink control signaling, and extended manners in time domain and frequency domain corresponding to a second part of the codes allocated for the RRI are respectively the same as extended manners in time domain and frequency domain corresponding to the codes allocated for a data part of the other uplink control signaling.

7. The apparatus of claim 6, wherein the extended manners in the time domain and the frequency domain corresponding to the first part of the codes allocated for the RRI are respectively the same as the extended manners in the time domain and the frequency domain corresponding to the codes allocated for the pilot part of the other uplink control signaling, and the extended manners in the time domain and the frequency domain corresponding to the second part of the codes allocated for the RRI are respectively the same as the extended manners in the time domain and the frequency domain corresponding to the codes allocated for the data part of the other uplink control signaling, comprises:
    extended manners in time domain and frequency domain corresponding to a first code allocated for the RRI are respectively the same as extended manners in time domain and frequency domain corresponding to a code allocated for the pilot part of the other uplink control signaling, and the first code allocated for the RRI is orthogonal with the code allocated for the pilot part of the other uplink control signaling in at least one of the time domain and the frequency domain; and extended manners in time domain and frequency domain corresponding to a second code allocated for the RRI are respectively the same as extended manners in time domain and frequency domain corresponding to a code allocated for the data part of the other uplink control signaling, and the second code allocated for the RRI is orthogonal with the code allocated for the data part of the other uplink control signaling in at least one of the time domain and the frequency domain, wherein the first code and the second code are allocated for one user terminal in one time slot.

8. The apparatus of claim 6, wherein the processor is further configured to detect the first part of the codes and the second part of the codes allocated for the RRI on the time and frequency resource in an incoherent detection manner.

9. A user terminal for sending a resource request indicator (RRI), comprising:
    a processor, configured to send a first code allocated for the RRI and a second code allocated for the RRI in one time slot,
    wherein the first code allocated for the RRI and a code allocated for a pilot part of an other uplink control signaling being sent in the same time and frequency resource, and the second code allocated for the RRI and a code allocated for a data part of the other uplink control signaling being sent in the same time and frequency resource, and wherein extended manners in time domain and frequency domain corresponding to the first code allocated for the RRI are respectively the same as extended manners in time domain and frequency domain corresponding to the code allocated for the pilot part of the other uplink control signaling, and extended manners in time domain and frequency domain corresponding to the second code allocated for the RRI are respectively the same as extended manners in time domain and frequency domain corresponding to the code allocated for the data part of the other uplink control signaling.

* * * * *